United States Patent [19]
Wu

[11] Patent Number: 5,722,057
[45] Date of Patent: Feb. 24, 1998

[54] MULTI-RESONANT ELECTRONIC POWER CONVERTER WITH A WIDE DYNAMIC RANGE

[75] Inventor: You-Sun Wu, Princeton Junction, N.J.

[73] Assignee: Lucent Technologies Inc., Murray Hill, N.J.

[21] Appl. No.: 594,568

[22] Filed: Jan. 31, 1996

Related U.S. Application Data

[62] Division of Ser. No. 126,814, Sep. 24, 1993, Pat. No. 5,530,638.

[51] Int. Cl.$^6$ .................. H04B 1/16; H04B 7/00
[52] U.S. Cl. ............... 455/127; 455/69; 455/127; 455/343; 363/17
[58] Field of Search ................ 455/68, 69, 116, 455/126, 127, 343; 363/26, 27, 17

[56] References Cited

U.S. PATENT DOCUMENTS

| | | | |
|---|---|---|---|
| 4,409,647 | 10/1983 | Terkanian | 363/27 |
| 5,065,301 | 11/1991 | Shioya et al. | 363/17 |
| 5,159,541 | 10/1992 | Jain | 363/26 |
| 5,204,970 | 4/1993 | Stengel et al. | 455/69 |
| 5,345,598 | 9/1994 | Dent | 455/127 |

*Primary Examiner*—Reinhard J. Eisenzopf
*Assistant Examiner*—Sam Bhattacharya

[57] ABSTRACT

Methods and apparatus for variably converting DC voltage to a different DC voltage level are effected by a multi-resonant electronic power converter with a wide output voltage dynamic range. The power conversion is accomplished by converting the DC voltage to an AC signal, adjusting or attenuating the AC signal to the desired amplitude, and then converting the AC signal back to a DC voltage. The output voltage may be adjusted by altering the frequency of the AC signal also known as the switching frequency. A wide dynamic range is achieved at a narrow switching frequency bandwidth by inserting either a fourth or higher order low pass filter or a notch filter at the output of the switching transistor. The high roll-off rate exhibited by either filter provides a relatively high dynamic range in a narrow frequency range.

9 Claims, 6 Drawing Sheets

MULTI-RESONANT ELECTRONIC POWER CONVERTER WITH A WIDE DYNAMIC RANGE

This is a divisional of application Ser. No. 08/126,814 filed on Sep. 24, 1993 now U.S. Pat. No. 5,530,638.

FIELD OF THE INVENTION

The present invention relates generally to a family of electronic circuits commonly known as DC—DC electronic power converters. More particularly, the invention relates to improvements in multi-resonant DC—DC electronic power converters.

BACKGROUND OF THE INVENTION

In communication satellites serving multiple users and in other applications having similar power constraints, it is desirable to have the capability to transmit signals at different strengths matched to the user's needs. The signal strength requirements of a particular satellite's users can vary greatly. For example, a low baud rate digital signal to be transmitted for one user may require much less transmission power than an analog television signal for another, due to different signal to noise ratio requirements for the two signals. Therefore, in order to utilize the satellite's limited power resources in an efficient and cost effective manner, it is beneficial to provide a power level appropriate for each user. It is known that by controllably varying the DC bias voltage levels to the satellite's rf amplifier stages, the transmission power of the satellite may be adjusted to meet a particular user's needs.

A multi-resonant DC—DC electronic power converter (MRC) is currently being employed to provide variable bias voltage levels. This MRC converts the satellite's high voltage DC bus into a DC output level. The output level is controlled by a switching frequency signal which is supplied to the MRC by a control circuit. The control circuit determines the switching frequency based upon the transmission power requirements.

The switching frequency signal drives a switching transistor in the MRC, which converts the satellite's high voltage DC bus into an AC voltage. The AC voltage is then processed by a simple LC low pass filter and thereafter converted back into DC. By choosing a switching frequency that falls on the gain slope region of the low pass filter, any adjustment in frequency will vary the dc output level. This prior art MRC, however, suffers from having a limited dynamic range of output levels.

The benefits of MRCs are not limited to satellite applications but are also desirable in many system applications where similar design constraints came into play. For example, portable and cellular telephones require various levels of power, depending on the distance between the transmitter and the receiver. An MRC would have similar advantages in those systems, as well as others.

SUMMARY OF THE INVENTION

The present invention provides an improved DC—DC electronic power converter having high efficiency and an output having a wider dynamic range over a given frequency range of operation. Alternatively, the same output range can be achieved utilizing a much narrower frequency range of operation. This narrower frequency range allows simplified system design constraints.

For applications utilizing a switching frequency band of 700 kHz to 1 MHz, an MRC according to the present invention can be constructed which is both small and lightweight. Because of the high frequency of operation, and because the frequency range of operation is relatively narrow for the output range obtained, a relatively small and light transformer may be utilized. One embodiment incorporates a specially designed third order notch filter. In another embodiment, this filter may be replaced by a fourth order LC ladder filter. Alternative filters or higher order may be used depending upon the design constraints of the intended environment of the power converter. For all these alternatives, highly improved operation or simplified system design constraints are readily achieved.

DETAILED DESCRIPTION

Figure 1:
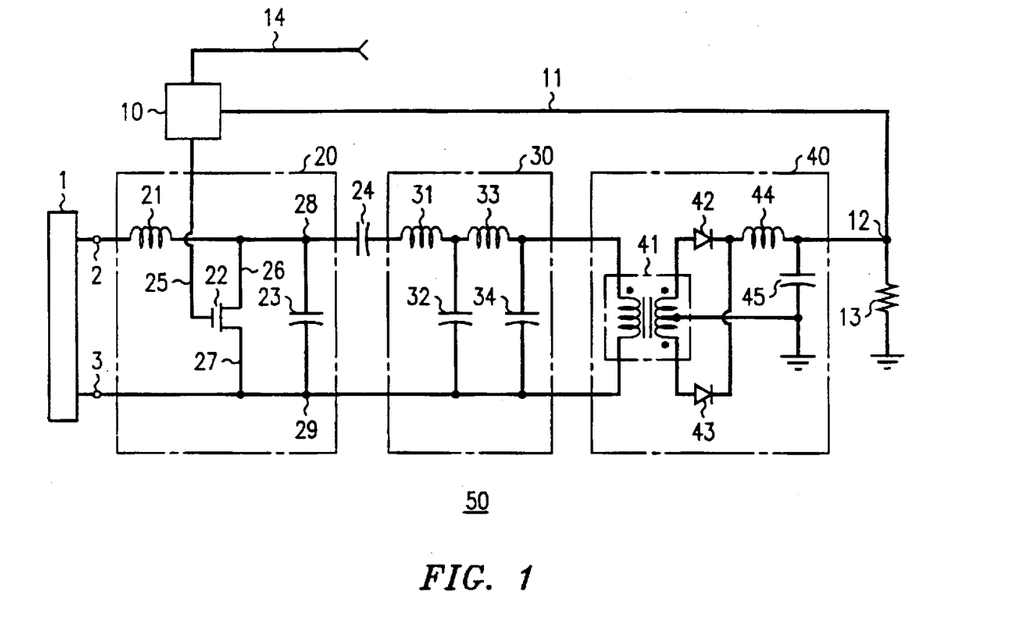
FIG. 1 is a schematic of an improved MRC according to the present invention which employs a fourth order LC ladder filter.

Referring to the drawings, FIG. 1 illustrates an MRC 50 according to one embodiment of the present invention. DC bus 1 which provides a DC voltage at its output is connected to nodes 2 and 3 of the MRC 50. The DC bus 1 may be the output of a satellite power supply powered by solar cells or any other suitable source of DC power, such as a battery. For convenience, node 3 of FIG. 1 will be referred to as ground, although it need not be true ground.

Nodes 2 and 3 serve as the input terminals of a DC-AC converter 20 comprising an inductor 21, a switching transistor 22, and a capacitor 23. The inductor 21 is connected between the node or input terminal 2 and drain 26 of the transistor 22. The capacitor 23 is connected to the drain 26 and to the ground node 3. The source 27 of transistor 22 is also connected to ground node 3. As discussed further below, the DC-AC converter 20 converts an input DC voltage to an AC signal, the frequency of which is determined by the rate of switching of the transistor 22, which is in turn controlled by the signal on its gate 25.

The gate 25 of the transistor 22, which preferably is a Hexfet IRH450 N-channel transistor, is connected to the output of a control circuit 10. The control circuit 10 includes a fixed on-time variable frequency controller, preferably a Unitrode UC1860, which provides a switched pulse signal at the desired frequency of operation. In operation, control circuit 10 calculates and generates appropriate frequency drive pulses, typically between 700 kHz and 1 MHz, which are applied to the gate 25 of transistor 22. As discussed further below, the frequency chosen determines the output voltage level of the MRC appearing at its output 12. The control circuit 10 also has an input 14 for receiving user information from the satellite.

The outputs 28 and 29 of the DC-AC converter 20 are connected through a DC blocking capacitor 24 to the inputs of a filter 30. The filter 30 is a fourth order LC ladder filter comprising inductors 31 and 33 and capacitors 32 and 34. The arrangement and connection of the components for an LC ladder filter is well-known in the art and is illustrated in FIG. 1. In the embodiment of FIG. 1 for a frequency range of operation of 700 kHz to 1 MHz, the capacitor 32 may suitably be a 3980 pF capacitor, the capacitor 34 may be a 1230 pF capacitor, the inductor 31 may be a 32.19 µH inductor and the inductor 33 may be a 33.19 µH inductor. Blocking capacitor 24 should be of a sufficiently high capacitance to not affect the frequency response of the filter 30 appreciably. For 700 kHz to 1 MHz range of operation, it may be a 0.22 µF capacitor.

The filter 30 is connected to the primary winding of a transformer 41. A center-tapped secondary winding of the transformer 41 is operatively connected to a voltage rectifier. The rectifier comprises diodes 42 and 43, an inductor 44 and a capacitor 45 connected to provide full wave rectification of the signal appearing across the secondary winding of transformer 41. The output of the rectifier is connected to the output 12 of the MRC 50. The output 12 of the MRC 50 provides power and is connected to a load which may be an amplifier stage of a transmitter in a satellite, radio, cellular phone or like system. The output 12 is also connected to the control circuit 10 through a feedback line 11.

Figure 2:
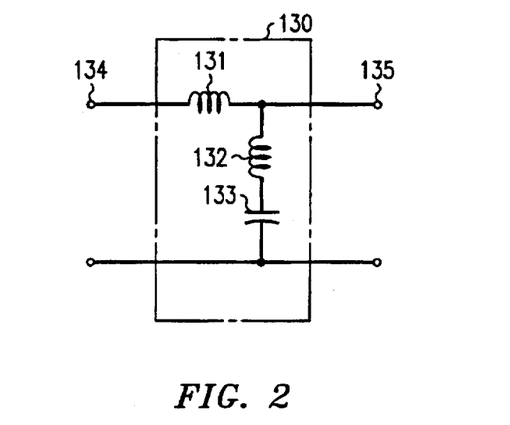
FIG. 2 is a schematic of a specially designed notch filter for use in an improved MRC according to the present invention.

FIG. 2 illustrates a notch filter 130 for utilization in another embodiment Of the improved MRC. The filter 30 in the MRC 50 of FIG. 1 may be replaced by the notch filter 130 of FIG. 2. Notch filter 130 comprises two inductors 131 and 132 and a capacitor 133 connected as shown in FIG. 2 and described below. For operation over a frequency range of 700 kHz to 1 MHz, the inductor 131 may suitably be a 24 µH inductor, connected between a nonground input 134 and a nonground output 135 of the filter 130. The inductor 132 may suitably be a 12.6 µH inductor, and the capacitor 36 may suitably be a 2200 pF capacitor, connected in series across the output 135 to ground.

The MRC 50 operates in the manner described as follows. In a communication satellite, the control circuit 10 determines the required DC output voltage of the MRC 50 based on a particular user's broadcast power requirements. Such requirements are communicated to the control circuit 10 through input 14. As discussed in connection with FIG. 7 below, other applications, such as a cellular phone, the control circuit may determine the required output voltage based, in part, on the distance of the transmission, with more power being required for greater distances. The control circuit 10 generates a pulse signal at a switching frequency that corresponds to the desired output voltage level of the MRC.

Additionally, the control circuit 10 is used to regulate the MRC's output voltage. During operation, the control circuit 10 monitors the output voltage at node 12 through feedback line 11 and provides for error correction through adjustment of the switching frequency.

Once the appropriate switching frequency has been determined, the control circuit 10 provides switched pulses to the gate 25 at that frequency, thereby causing the transistor 22 to "turn on" for the duration of the pulse, and "turn off" for the period between pulses. Each time the transistor 22 is turned on, current flows freely across the drain 26 and source 27 connections, causing a short circuit to ground. Each time transistor 22 if turned off, no current flows across the drain 26 and source 27 connections, creating an open circuit between the drain 26 and the source 27 of the transistor 22. As a result, the voltage across the outputs 28 and 29 of the DC-AC converter 20 oscillates between the DC bus voltage and ground at the switching frequency. Inductor 21 and capacitor 23 serve to smooth the alternating voltage substantially into a sine wave. The storage capabilities of capacitor 23 and inductor 21 may also be used to adjust the amplitude of the resulting sine wave. Accordingly, the output of the DC-AC converter 10 is an AC signal with a frequency equal to the switching frequency.

Figure 4:
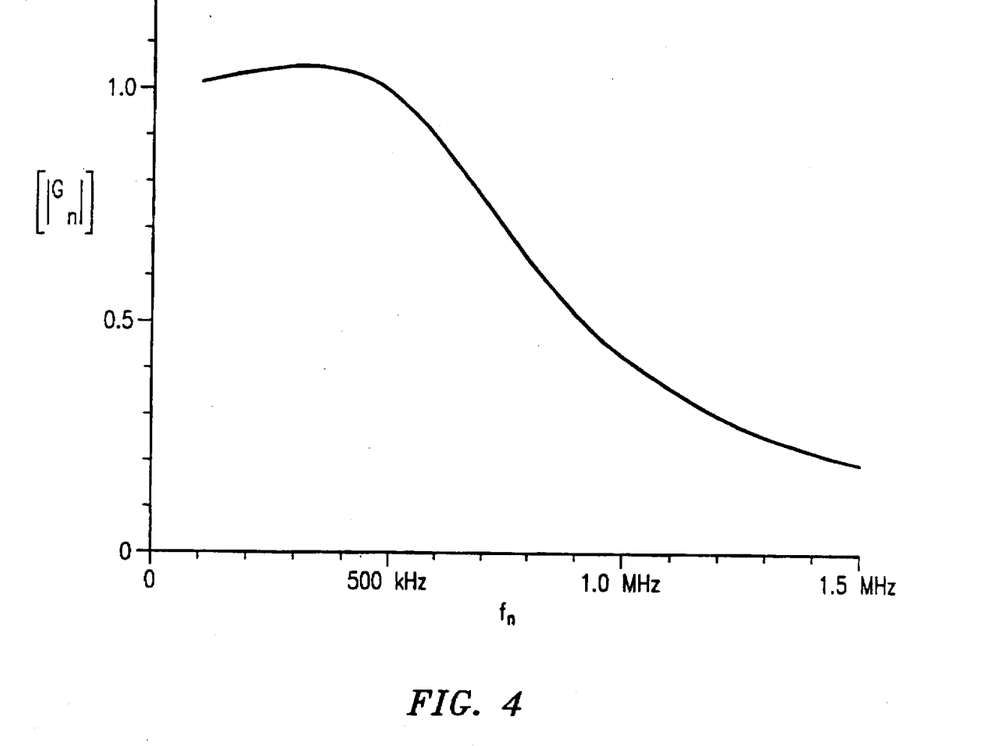
FIG. 4 is a graph of the gain versus frequency response of the prior art filter.
Figure 5:
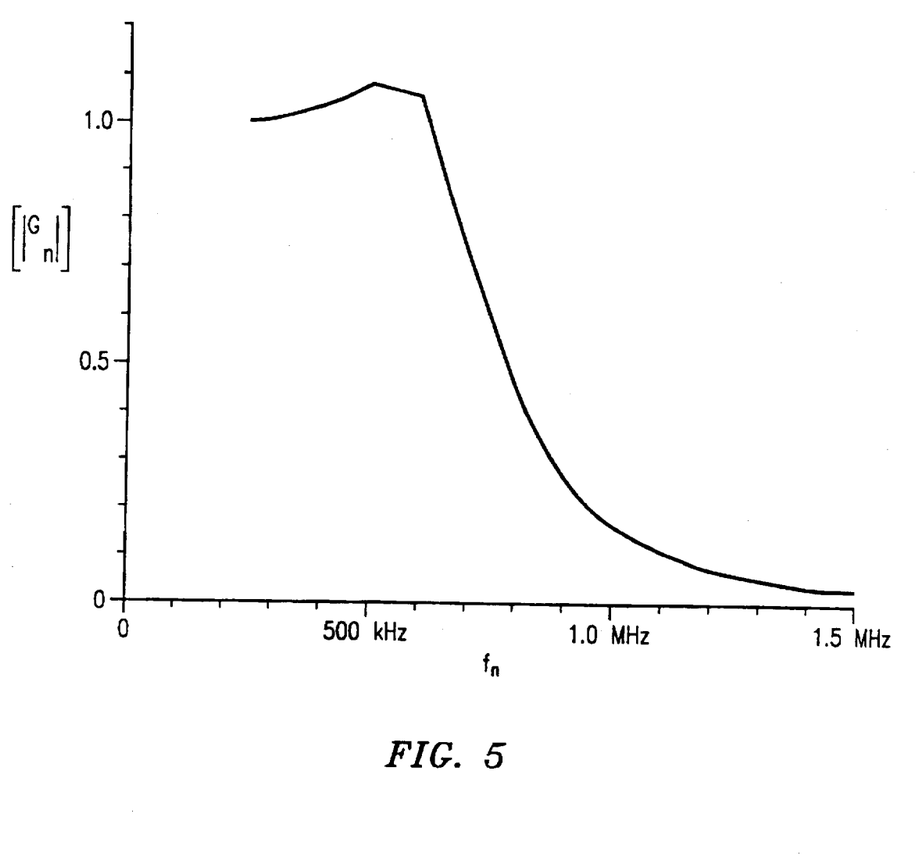
FIG. 5 is a graph of the gain versus frequency response of the fourth order LC ladder filter in the improved MRC.

The AC signal at the outputs 28 and 29 passes through the blocking capacitor 24 to the filter 30. The capacitor 24 blocks any residual DC voltage present at the output 28 from reaching the filter 30. The output voltage of the filter 30 is dependent on the frequency of this AC signal as illustrated in FIG. 4. As further illustrated in FIG. 4, the gain-frequency response of the filter 30 exhibits a high roll-off rate. Likewise, as illustrated in FIG. 5, the gain-frequency response of the alternative notch filter 130 also exhibits a high roll-off rate. Consequently, by adjusting the frequency of the signal pulse at the gate of transistor 22, the output voltage of the filter (and hence the circuit) may be varied by a substantial amount.

After the AC signal passes through the filter 30, it enters the primary winding of the transformer 41. The transformer 41 serves to both isolate the output signals and further adjust the voltage amplitude. In one embodiment of the invention, the transformer 41 has a 10:1 turn ratio. Under operating conditions, therefore, the transformer itself provides a voltage conversion of a factor of approximately ten.

The rectifier circuit 40 thereafter converts the transformed AC signal which appears at the second winding of the transformer 41 into a DC output voltage. This DC output voltage appears at the MRC output 12. The output of the MRC 50 may be utilized to power a load which is represented by the resistor 13 in FIG. 1. In a communications satellite the load is actually a bank of rf amplifier stages.

To illustrate the advantages of the invention, it is helpful to compare the capabilities of the prior art converter to MRCs according to the present invention.

Figure 3:
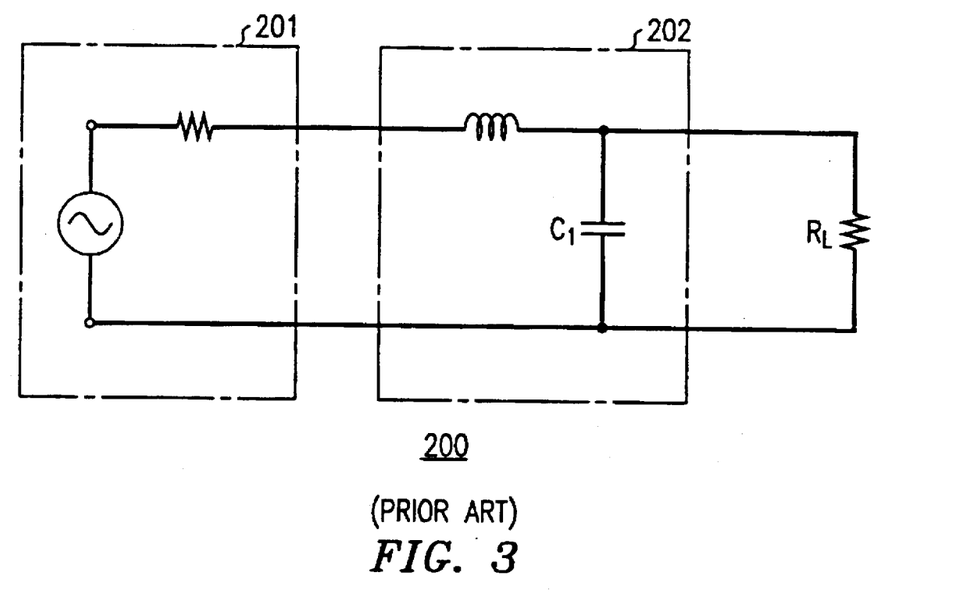
FIG. 3 is a schematic of the equivalent circuit of the prior art MRC employing a second order LC filter.

FIG. 3 shows the equivalent circuit of a conventional prior art MRC 200 that has a simple LC low pass filter 202 connected to an equivalent circuit 201 representative of a DC bus input and AC converter means. Load resistance 203 is the equivalent real load reflected to the primary winding of the transformer. One can derive the following voltage gain relationship for the MRC 200:

$$\frac{V_{OUT}}{V_{IN}} = \frac{R_L}{[R_L + (1 + jwC_1 R_L)(jwL)]}.$$

Due to the design constraints, particularly for an MRC to be used in a satellite application, the useable switching frequency bandwidth must necessarily be narrow. In particular, at present, the digital control circuitry cannot operate effectively over 1 MHz because nonlinear behavior of circuit components at high frequencies and other effects can cause system degradation at frequencies in excess of 1 MHz. Furthermore, frequencies lower than 700 kHz would necessitate the use of a transformer in the MRC which is too large and heavy. As a result, the usable frequency band in one current design is from 700 kHz to 1 MHz.

Accordingly, FIG. 4 shows the calculated absolute value of the voltage gain $G_a$ as a function of switching frequency $f_a$ for the prior art LC low pass filter 202 which is tuned to roll-off maximally between 700 kHz and 1 MHz. If the switching frequency is operated in the preferred bandwidth, from 700 kHz to 1 MHz, the voltage gain will drop from 0.75 to 0.43. Consequently, the. dynamic range factor is: dynamic range factor=0.75-0.43/0.75=43%. This value is insufficient to provide the full range of power levels desired.

FIG. 5 shows the theoretical output response of the improved MRC 50 employing the fourth order LC ladder filter 30 with the component values discussed above as suitable for 700 kHz-1 MHz. In the same frequency range, between 700 kHz and 1 MHz, the range of the variable gain is from 0.75 to 0.17. As a result, the dynamic range factor of the improved MRC 50 is 77%. The fourth order LC ladder 30, therefore, provides substantial improvement over the prior art.

Figure 6:
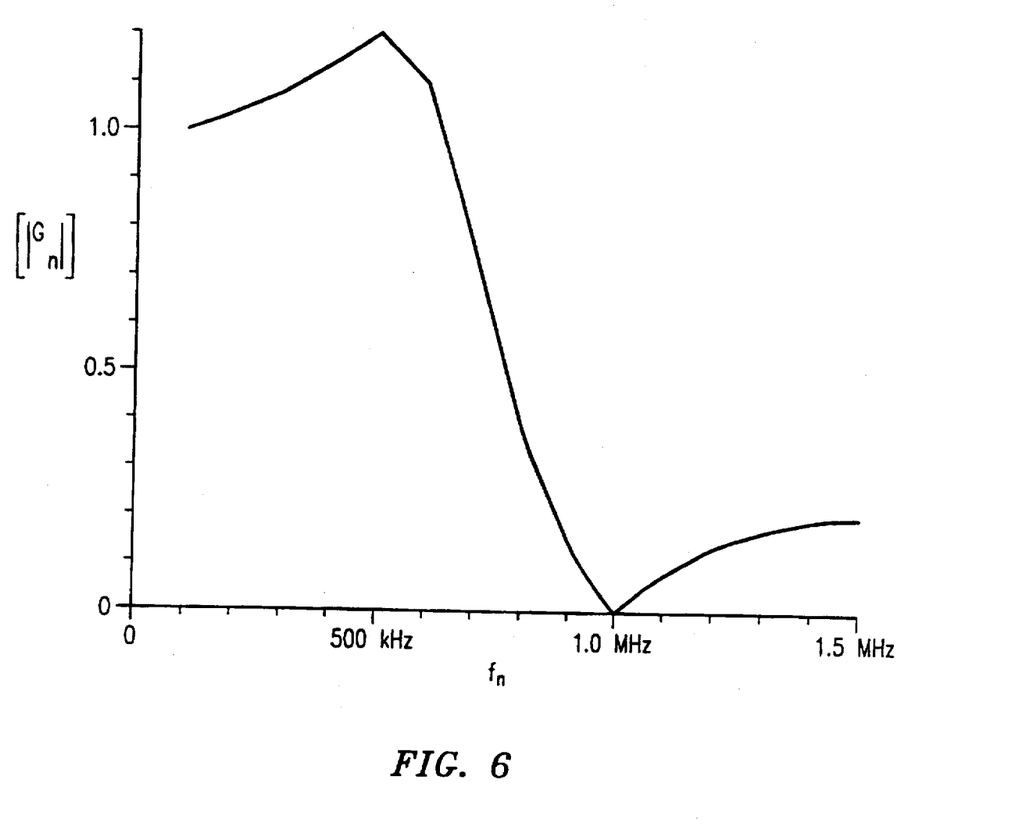
FIG. 6 is a graph of the gain versus frequency response of the notch filter in the improved MRC.

FIG. 6 shows the theoretical output response of the notch filter 130 employed in the alternative improved MRC. By designing the notch filter 130 with the values discussed above and such that its resonant frequency is 1 MHz, the output gain range of the filter 130 can be between 0.75 and 0. This results in a dynamic range factor of 100%, which is close to an ideal MRC response.

As illustrated by FIGS. 4, 5 and 6, the present invention, therefore, provides a clear improvement over the state of the art.

The MRC according to the present invention has wide potential application other than in communication satellites. As one example, the wide output dynamic range power supply of the present invention may be particularly useful in mobile transmission devices, such as portable or cellular telephones or two-way radios. The power required of a transmitter in such devices is dependent, in part, on its physical location with respect to a receiver, which is often changing. As a consequence, such devices should desirably transmit at variable output powers. By employing a suitable control circuit to determine the power required by a transmitter at any given time and then controllably adjusting a control such as the control 10 of FIG. 1, the MRC of the present invention provides a highly efficient transmission power source where either the transmitter or receiver is mobile.

Figure 7:
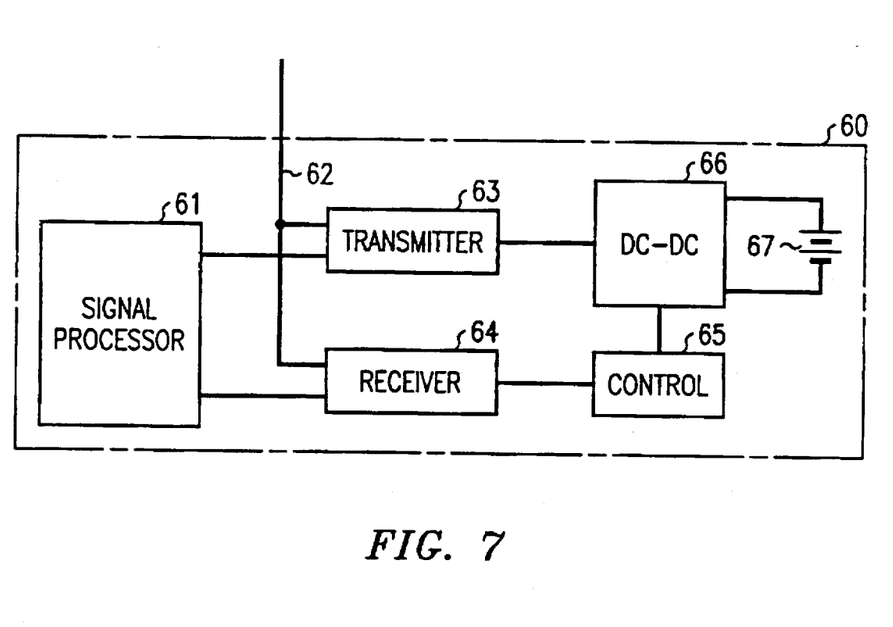
FIG. 7 is a diagram of an improved mobile transmitter/receiver utilizing an improved multi-resonant electronic power converter according to the present invention.

By way of example, FIG. 7 illustrates a mobile transceiver unit 60 designed in accordance with the present invention. A transmitter 63 and a receiver 64 are connected to a signal processor 61. The signal processor 61 may be any apparatus or system that both receives information and sends information, such as a telephone headset, data processing equipment, or a two-way radio. An antenna 62 is connected to the transmitter 63 and receiver 64, or a separate antenna for each may be provided. A DC—DC converter 66 constructed as shown in blocks 20, 30, and 40 of FIG. 1 is provided. Alternatively, DC—DC converter 66 may employ the filter 130 of FIG. 2 instead of filter 30 of FIG. 1, or any filter suitably designed to provide the appropriate gain roll-off at the desired frequency range of operation. The base of the switching transistor (FIG. 1, component 22 ) of DC—DC converter 66 is connected to the output of the control circuit 65. A DC source, such as a DC storage battery 67 is connected across the input of the converter 66. The output of the converter 66 is connected to the transmitter 63 in a manner to provide power to the transmitter 63. The signal processor 61 has an input connected to one output of the receiver 64, and an output connected to the input of the transmitter 63.

When an incoming signal appears on the antenna 62 it is amplified and otherwise processed by the receiver 64. This processed signal enters the signal processor 61, which may be data processing means, a telephone or radio headset or the like. Part of the incoming signal enters the control 65, which measures the strength of the signal. Based upon the strength of the incoming signal and other relevant information, the control 65 determines the power necessary for adequate transmission to the remote source of the original signal. Based upon that determination, the control 65 generates a pulse signal at a sufficient frequency to cause the DC—DC converter to produce adequate transmission power. As more or less power is required, the output of converter 66 is varied. Control circuitry capable of performing the foregoing is well-known in the art.

The pulse signal enters DC—DC converter 66, which produces an AC signal at the pulse frequency. DC battery means 67 provides the power for the AC signal. The AC signal is then filtered to an amplitude corresponding to the required output power. The filtered AC signal is then converted back into a DC voltage. The DC output voltage supplied by the DC—DC converter 66 provides transmission power to the transmitter 63.

The signal processor 61 periodically generates outgoing signals for transmission. The outgoing signal enters transmitter 63, which amplifies and otherwise processes the outgoing signal. The transmitter 63 then sends the signal over the antenna 62 at the power level provided from the DC—DC converter 66, this power level having been determined by the measured power of a previously received incoming signal.

The MRC of the present invention, by exhibiting a wide dynamic range for a given bandwidth of operation, allows mobile transmitters and receivers similar to the one described above having a more efficient use of power and consequently longer battery life.

It is to be understood that the above-described arrangements of the invention are merely illustrative. Other arrangements may be devised by those skilled in the art which will embody the principles of the invention and fall within the spirit and scope thereof.

I claim:

1. A method of providing a variable power supply based on a particular user's power requirement, utilizing a variable high frequency multi-resonant electronic power control, the method comprising the steps of:

a) periodically detecting incoming signals;

b) measuring the strength of the incoming signal and determining the signal strength required to transmit a signal to the source of the incoming signal;

c) generating a pulse signal at a frequency which corresponds to the required transmission signal strength;

d) using the pulse signal to convert a DC voltage to an AC signal at the pulse signal frequency;

e) processing the AC signal by applying it to a filter operable to achieve greater than 50% variation in output magnitude in a frequency bandwidth which is less than 30% of the highest frequency in the band;

f) converting the processed AC signal to a DC voltage; and g) employing the converted DC voltage to provide the required power to a transmitter.

2. A method of providing a particular user's power requirement utilizing a variable high frequency multi-resonant electronic power converter, the method comprising the steps of:

a) periodically detecting incoming signals;

b) measuring the strength of an incoming signal;

c) generating a pulse signal at a frequency which corresponds to the strength of the detected incoming signal;

d) using the pulse signal to convert a DC voltage source to an AC signal at the pulse signal frequency;

e) processing the AC signal by applying it to a filter operable to achieve greater than 50% variation in output magnitude in a frequency bandwidth which is less than one half the lowest frequency in the band;

f) converting the processed AC signal to a DC voltage; and g) employing the converted DC voltage to provide the required power to a transmitter.

3. An improved variable high frequency multi-resonant power converter for providing power to a transmitter at a level relative to the strength of an incoming signal indicative of a particular user's power requirements comprising:

a) means having an output for determining the strength of an incoming signal from a remote source and generating a pulse signal at a frequency corresponding to the strength of incoming signal;

b) a DC power source;

c) a DC—DC multi-resonant converter having a first input and a second input and an output, the first input connected to the output of the pulse generating means, the second input connected to the DC bus, said converter operable to produce an output voltage level proportional to the frequency of the pulse at the first input, said converter further comprising a filter operable to produce greater than a 50% variation in output magnitude within a frequency bandwidth which is less than one-half the frequency in the band.

4. A method of providing a particular user's power requirement to a multi-use transmitter utilizing a variable high frequency multi-resonant electronic power converter, the method comprising the steps of:

a) determining the signal strength required to transmit a particular set of signals for a particular user's power requirement based on a predetermined value of signal strength for said use;

b) generating a pulse signal at a frequency which corresponds to the required transmission signal strength;

c) using the pulse signal to convert a DC voltage to an AC signal at the pulse signal frequency;

d) processing the AC signal by applying it to a filter operable to achieve greater than 50% variation in output magnitude in a frequency bandwidth which is less than 30% of the highest frequency in the band;

e) converting the processed AC signal to a DC voltage; and f) employing the converted DC voltage to provide power to the transmitter.

5. An improved variable high frequency multi-resonant electronic power converter for providing a required DC output voltage based on a particular user's power requirements comprising:

a) a sources of DC power;

b) a DC-AC converter having an input connected to the source of DC power, a frequency control input, and an AC output the frequency of which varies with the frequency of drive pulses applied to the frequency control input;

c) a fourth or greater order low pass filter having an input connected across the AC output of the DC-AC converter and having an output which varies with frequency, said filter being characterized by a gain-frequency response exhibiting a high roll-off rate for a relatively small change in frequency of operation;

d) a small, lightweight transformer having a primary winding and a secondary winding with its primary winding connected across the output of the filter;

e) a rectifier circuit operable to convert an AC voltage to a DC voltage having an input connected to the secondary winding of the transformer and having an output;

f) an output load connected to the output of the rectifier circuit; and g) a control circuit with an input for receiving the particular user's power requirements and an output connected to said frequency control input of the DC-AC converter, said control circuit calculating and generating high frequency drive pulses on its output so that an appropriate DC voltage is supplied to the output load.

6. The apparatus of claim 5, wherein the output load comprises a bank of rf amplifier stages.

7. The apparatus of claim 5, wherein the control circuit is capable of producing a range of frequencies from 700 kHz to 1 MHz at its output.

8. An improved variable high frequency multi-resonant electronic power converter for providing a required DC output voltage based on a particular user's power requirements comprising:

a) a source of DC power;

b) a DC-AC converter having an input connected to the source of DC power, a frequency control input, and an AC output the frequency of which varies with the frequency of drive pulses applied to the frequency control input;

c) a notch filter having an input connected across the output of the DC-AC converter and having an output which varies with frequency, said filter being characterized by a gain-frequency response exhibiting a high roll-off rate for a relatively small change in frequency of operation;

d) a small, lightweight transformer having a primary winding a secondary winding with its primary winding connected across the output of the filter;

e) a rectifier circuit operable to convert an AC voltage to a DC voltage having an input connected to the secondary winding of the transformer and having an output;

f) an output load connected to the output of the rectifier circuit; and g) a control circuit with an input for receiving the particular user's power requirements and an output connected to said frequency control input of the DC-AC converter, said control circuit calculating and generating high frequency drive pulses on its output so that an appropriate DC voltage is supplied to the output load.

9. The apparatus of claim 8 having a dynamic range of approximately 100%.

* * * * *